(12) United States Patent
Gandhi et al.

(10) Patent No.: US 7,720,884 B1
(45) Date of Patent: May 18, 2010

(54) AUTOMATIC GENERATION OF ROUTINES AND/OR SCHEMAS FOR DATABASE MANAGEMENT

(75) Inventors: Rajesh K. Gandhi, Shrewsbury, MA (US); Venkata R. Tiruveedi, Franklin, MA (US); Keith A. Carson, Jr., Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 428 days.

(21) Appl. No.: 11/731,582

(22) Filed: Mar. 30, 2007

(51) Int. Cl.
*G06F 7/00* (2006.01)
*G06F 17/30* (2006.01)
*G06F 15/173* (2006.01)

(52) U.S. Cl. .................. 707/804; 707/809; 709/223
(58) Field of Classification Search ............... None
See application file for complete search history.

(56) References Cited

U.S. PATENT DOCUMENTS

| | | | | |
|---|---|---|---|---|
| 6,122,639 | A * | 9/2000 | Babu et al. | 707/103 R |
| 6,304,867 | B1 * | 10/2001 | Schmidt | 707/2 |
| 6,591,272 | B1 * | 7/2003 | Williams | 707/102 |
| 6,973,460 | B1 * | 12/2005 | Mitra | 707/103 R |
| 7,197,489 | B1 * | 3/2007 | Gauvin et al. | 707/1 |
| 7,228,306 | B1 * | 6/2007 | Altman et al. | 707/100 |
| 2003/0208581 | A1 * | 11/2003 | Behren et al. | 709/223 |
| 2006/0218163 | A1 * | 9/2006 | Marcjan et al. | 707/100 |
| 2007/0038651 | A1 * | 2/2007 | Bernstein et al. | 707/100 |
| 2007/0100834 | A1 * | 5/2007 | Landry et al. | 707/10 |
| 2007/0203933 | A1 * | 8/2007 | Iversen et al. | 707/102 |
| 2007/0294208 | A1 * | 12/2007 | Chowdhary et al. | 707/1 |
| 2007/0294266 | A1 * | 12/2007 | Chowdhary et al. | 707/100 |
| 2008/0133455 | A1 * | 6/2008 | Giordano | 707/2 |
| 2008/0263104 | A1 * | 10/2008 | Chowdhary et al. | 707/200 |
| 2009/0024642 | A1 * | 1/2009 | Vaschillo et al. | 707/100 |

* cited by examiner

*Primary Examiner*—Mohammad Ali
*Assistant Examiner*—Patrick A Darno
(74) *Attorney, Agent, or Firm*—Chapin IP Law, LLC

(57) ABSTRACT

A database environment includes a staging database and master database. Among other functions, the staging database provides a location to store data prior to be copied over the master database. Each time the database environment is modified (e.g., a developer specifies a different configuration associated with the staging database and/or the master database), a database administrator initiates execution of an auto-repository process to automatically generate a corresponding new set of routines enabling management of the database environment. Accordingly, each time there are changes to (one or more schemas associated with) the database environment, there is no need for a programmer to manually modify the corresponding management routines based on the changes. Instead, the auto-repository process automatically generates the corresponding set of custom routines to enable management of the database environment.

15 Claims, 7 Drawing Sheets

AUTOMATIC GENERATION OF ROUTINES AND/OR SCHEMAS FOR DATABASE MANAGEMENT

BACKGROUND

Information services and data processing industries in general have rapidly expanded as a result of the need for computer systems to manage and store large amounts of data. As an example, financial service companies such as banks, mutual fund companies and the like now, more than ever before, require access to many hundreds of gigabytes or even terabytes of data and files stored in high capacity data storage systems. Other types of service companies have similar needs for data storage.

Data storage system developers have responded to an increased need for storage by integrating high capacity data storage systems, data communications devices (e.g., switches), and computer systems (e.g., host computers or servers) into networks called "storage networks" or "Storage Area Networks" (SANs.) In general, a storage area network is a collection of data storage systems that are networked together via a switching fabric to a number of host computer systems operating as servers. The host computers access data stored in the data storage systems on behalf of client computers that request data from the data storage systems. For example, according to conventional applications, upon receiving a storage access request, a respective host computer in the storage area network accesses a large repository of storage through the switching fabric of the storage area network on behalf of the requesting client. Thus, via the host computer (e.g., server), a client has access to the shared storage system through the host computer. In many applications, storage area networks support high-speed acquisitions of data so that the host servers are able to promptly retrieve and store data from the data storage system.

Conventional storage area network management applications typically include a graphical user interface (GUI) that enables a network manager to graphically manage, control, and configure various types of hardware and software resources associated with a corresponding managed storage area network. For example, one conventional storage management application generates a graphical user interface utilized by a storage administrator to graphically select, interact with, and manage local or remote devices and software processes associated with the storage area network. Based on use of the graphical user interface in combination with an input device such as a hand operated mouse and corresponding pointer displayed on a viewing screen, a storage administrator is able to manage hardware and software entities such as file systems, databases, storage devices, volumes, peripherals, network data communications devices, etc., associated with the storage area network. Consequently, a storage management station and associated management software enables a storage administrator (a person responsible for managing the storage network) to manage the storage area network and its resources.

One way of managing resources associated with the storage area network is to maintain so-called managed objects. In general, a managed object is a software entity that defines a corresponding hardware or software resource of the storage area network. The network administrator utilizes the managed objects to identify different resources associated with the storage area network.

A set of managed objects can form an object hierarchy. A "top level" object (e.g., an object at a highest tier) associated with the hierarchy represents a particular storage resource (e.g., storage system) in the storage area network. Objects in the hierarchy beneath the "top level" object represent hardware or software resources of the storage area network associated with the particular storage resource. Accordingly, a hierarchy of managed objects can define specific resources and corresponding sub-resources in the storage area network associated with a respective storage system.

A storage administrator typically configures the storage area network to include multiple storage systems by creating and maintaining multiple object hierarchies. As suggested above, each object hierarchy represents a unique storage system (e.g., portion of storage area network resource information) associated with the storage area network. Certain resources can be shared among multiple storage systems. Thus, multiple object hierarchies associated with the storage area network can include the same managed object. Other resources of the storage area network can be exclusive to a particular one of the defined storage systems.

Typically, each managed object (e.g., storage area network resource) of the storage area network has associated object data. According to one conventional application, object data associated with respective managed objects is stored in a relational database. Upon instantiation, mapping metadata provides an indication how to populate managed objects with corresponding object data retrieved from the relational database.

Enterprise Storage Networks or Storage Area Networks (SANs) are large and complex environments that include various elements such as storage arrays, switches, hosts and databases all inter-networked. These elements may exist in number by the hundreds in large installations of such environments. These elements in turn may consist of several hundred or thousands of manageable elements or managed resources such as storage devices, storage and switch ports, database instances, host devices and file systems, and the like. Management of such environments is a daunting task and typically requires Storage Resource Management solutions such as EMC's Control Center (ECC) family of products, available from EMC Corporation of Hopkinton, Mass.

One configuration of ECC includes agents that are deployed on host computer systems in a SAN for the purpose of gathering data about the various managed resources in the SAN. The agents periodically collect network management data on components such as hosts, switches and storage systems that process and persist data, as well as on applications that use persisted information to enable the management of these environments. In other words, agents collect data associated with the managed resources, and that data is inserted into databases for use within Storage Resource Management solutions, such as ECC. ECC identifies the entire process of retrieving the collected data from agents to data persistence as a transaction. Agents collect data periodically, such as nightly, on the resources and engage in a transaction to send the colleted data to the ECC repository for access by ECC applications such as console and server processes that allow SAN administrators to manage the SAN.

In the ECC management application, an agent collects data associated with the managed resources such as data storage systems, hosts, switches and the like. When managed object data is inserted into the production database, that data can be displayed on the console for the network manager to view. In some instances, a set of managed object data collected by an agent from a resource such as a Symmetrix™ disk array system is a very large amount of data to be placed into the production database. In this situation, the agent divides the collected set of data into manageable partitions prior to being transmitted to the production database. The agent then serially transmits each partition, one by one, to a store process for placement into the production database (e.g., a master database) for storage. For large collections of such data, the agent transmits the data to the store process that performs a staging operation on the data in a staging database prior to making the data available to the server and console processes within the production database. One purpose of staging is to account for the time it takes the agent to transmit all partitions of a transaction between the agent and the store process. When the data from the agent is fully transferred to the store process (i.e. the last partition is received for a transaction) and is complete in the staging database, the last part of the staging operation causes the data in the staging database to be copied to the production database where the data is inserted for access by the management application (e.g. the server and console processes).

SUMMARY

Conventional database applications such as those as discussed above suffer from a number of deficiencies. For example, conventional databases can be used to store data as mentioned above. However, each time there is a change to the database schema, a corresponding set of functions that perform operations with respect to the database must be modified in accordance with the database changes. Thus, changes to a database (or corresponding schema) can require a software programmer to have to manually modify database management code depending on the changes being made to the database.

Techniques discussed herein deviate with respect to conventional applications such as those discussed above as well as techniques known in the prior art. In particular, embodiments herein enable automatic generation of a set of routines (e.g., procedures, functions, etc.) for managing contents of a respective database depending on a current database schema used to store data. Each time the production database schema for storing data is updated or modified in a network management application, the system described herein provides a routine generator that automatically generates a subsequent (e.g., updated) schema for the staging database (that accounts for changes to production database that might effect staging), as well as set of routines for carrying out the different management operations to accomplish staging of data that is sent from an agent for storage within the production database. That is, the system disclosed herein can automatically (e.g. without programmer involvement) produce a new staging schema and new staging routines that account for any changes made to a production database used in a network management application.

More specifically, in one embodiment, a database environment includes a staging database and a master database. The staging database can store incremental data changes prior to actual copying of received data to the master database. On completion of processing of all partitioned data (160 in FIG. 1.) the store initiates the copy of the incremental data changes stored in the staging database are copied from the staging database to the master database via use of a set of corresponding routines. If the dataset (FIG. 1 160) received from agent has 1 partition then different generated routine is used to save the processed data simultaneously in both staging and master database. The generator of routines can have hard-coded logic that generates appropriate instructions (SQL code) for routines depending on a model used for storing such data.

As briefly discussed above, embodiments herein include automatic generation (or re-generation as the case may be) of a set of management routines depending on a current database schema associated with the staging database, the master database, etc. For example, a first routine of the management routines can be configured to enable storage of data in the staging database, a second routine can be configured to enable copying of data in the staging database to the master database, a third routine can be configured to compare whether contents of the staging database are synchronized with contents of the staging database, and so on. Each routine in the set of routines for managing the databases can include a customized set of instructions depending on a current database schema configuration (e.g., tables, relationships, etc.) of the database environment.

In one embodiment, an auto-repository function generates a custom set of routines for managing a database based at least in part on a definition (e.g., master database schema information) associated with a master database for storing storage area network resource information. A database manager can specify which portions of the master database will be replicated and included in the staging database, which is configured to at least temporarily store the storage area network resource information prior to being transferred (e.g., copied) to the master database. Based on master database schema information and the input from the database manager, the auto-repository function generates a set of staging database schema information (e.g., metadata files). The generated staging database schema information defines a relational storage structure associated with the staging database. In other words, the staging database schema information specifies a model for temporarily storing the storage area network resource information prior to being committed to the master database. The auto-repository utilizes the staging database schema information, the master database schema information, and/or the initiate creation of a corresponding set of routines for managing the database environment including the staging database and/or the master database. In one embodiment, the automatically generated routines are stored in the database environment as callable routines. Accordingly, remote processes can initiate management of the database environment via execution of the routines.

One particularly useful application of the auto-repository function according to embodiments herein is a database environment including a staging database and master database. Each time the database environment is modified (e.g., a developer specifies a different configuration associated with the staging database and/or the master database), the auto-repository function automatically generates a corresponding new set of routines used for management of the database environment. Accordingly, each time there are changes to (one or more schemas associated with) the database environment, there is no need for a programmer to manually modify the corresponding management routines based on the changes. Instead, an auto-repository function automatically generates the corresponding set of custom routines to manage the database environment.

In addition to the embodiments as discussed above, other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

In addition to the embodiments discussed above, other embodiments herein include a computerized device (e.g., a host computer, workstation, etc.) configured to support the techniques disclosed herein such as creation and/or updating of routines to carry out operations with respect to a staging database and master database. In such embodiments, a computer environment to carry out the invention includes a memory system, a processor (e.g., a processing device), a respective display, and an interconnect connecting the processor and the memory system. The interconnect can also support communications with the respective display (e.g., display screen or display medium). The memory system can be encoded with an application that, when executed on a respective processor, supports database management according to techniques herein.

Yet other embodiments of the present disclosure include software programs to perform the method embodiment and operations summarized above and disclosed in detail below in the Detailed Description section of this disclosure. More specifically, one embodiment herein includes a computer program product (e.g., a computer-readable medium). The computer program product includes computer program logic (e.g., software instructions) encoded thereon. Such computer instructions can be executed on a computerized device to support parallel processing according to embodiments herein. For example, the computer program logic, when executed on at least one processor associated with a computing system, causes the processor to perform the operations (e.g., the methods) indicated herein as embodiments of the present disclosure. Such arrangements as further disclosed herein can be provided as software, code and/or other data structures arranged or encoded on a computer readable medium such as an optical medium (e.g., CD-ROM), floppy or hard disk, or other medium such as firmware or microcode in one or more ROM or RAM or PROM chips or as an Application Specific Integrated Circuit (ASIC). The software or firmware or other such configurations can be installed on a computerized device to cause one or more processors in the computerized device to perform the techniques explained herein.

Yet another more particular technique of the present disclosure is directed to a computer program product or computer environment that includes a computer readable medium having instructions stored thereon to facilitate generation of routines (e.g., procedures, functions, etc.) to manage contents of a staging database and/or a corresponding main database. The instructions and corresponding execution support operations of: i) receiving master database schema information defining attributes of a master database for storing storage area network resource information; ii) based on the master database schema information, initiating generation of staging database schema information associated with a staging database for storage of the storage area network resource information prior copied to the master database, the staging database including a subset of resources in the master database; and iii) in accordance with the staging database schema information and the master database schema information, initiating generation of a corresponding set of routines for managing at least one of the master database and the staging database.

Other embodiments of the present disclosure include hardware and/or software programs to perform any of the method embodiment steps and operations summarized above and disclosed in detail below.

It should be understood that the system disclosed herein may be embodied strictly as a software program, as software and hardware, or as hardware alone. The features disclosed herein may be employed in data communications devices and other computerized devices and software systems for such devices such as those manufactured by EMC, Inc., of Hopkinton, Mass.

Techniques herein are well suited for use in applications such as those supporting database management and use of a staging database to store data. However, it should be noted that configurations herein are not limited to such use and thus configurations herein and deviations thereof are well suited for use in other environments as well.

Each of the different features, techniques, configurations, etc. discussed herein can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below. Although not exhaustive, the claims section also provides different perspectives of the invention based on matter recited in the specification.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

A database environment includes a staging database and master database. The staging database provides a location to initially store data prior to being copied over to the master database. Each time the database environment is modified (e.g., a developer specifies a different configuration associated with the staging database and/or the master database), the developer initiates execution of an auto-repository process to automatically generate a corresponding new set of routines enabling management of the database environment. Accordingly, each time there are changes to (one or more schemas associated with) the database environment, there is no need for a programmer to manually modify the corresponding management routines based on the changes. Instead, the auto-repository process automatically generates the corresponding set of custom routines to enable management of the database environment.

Figure 1:
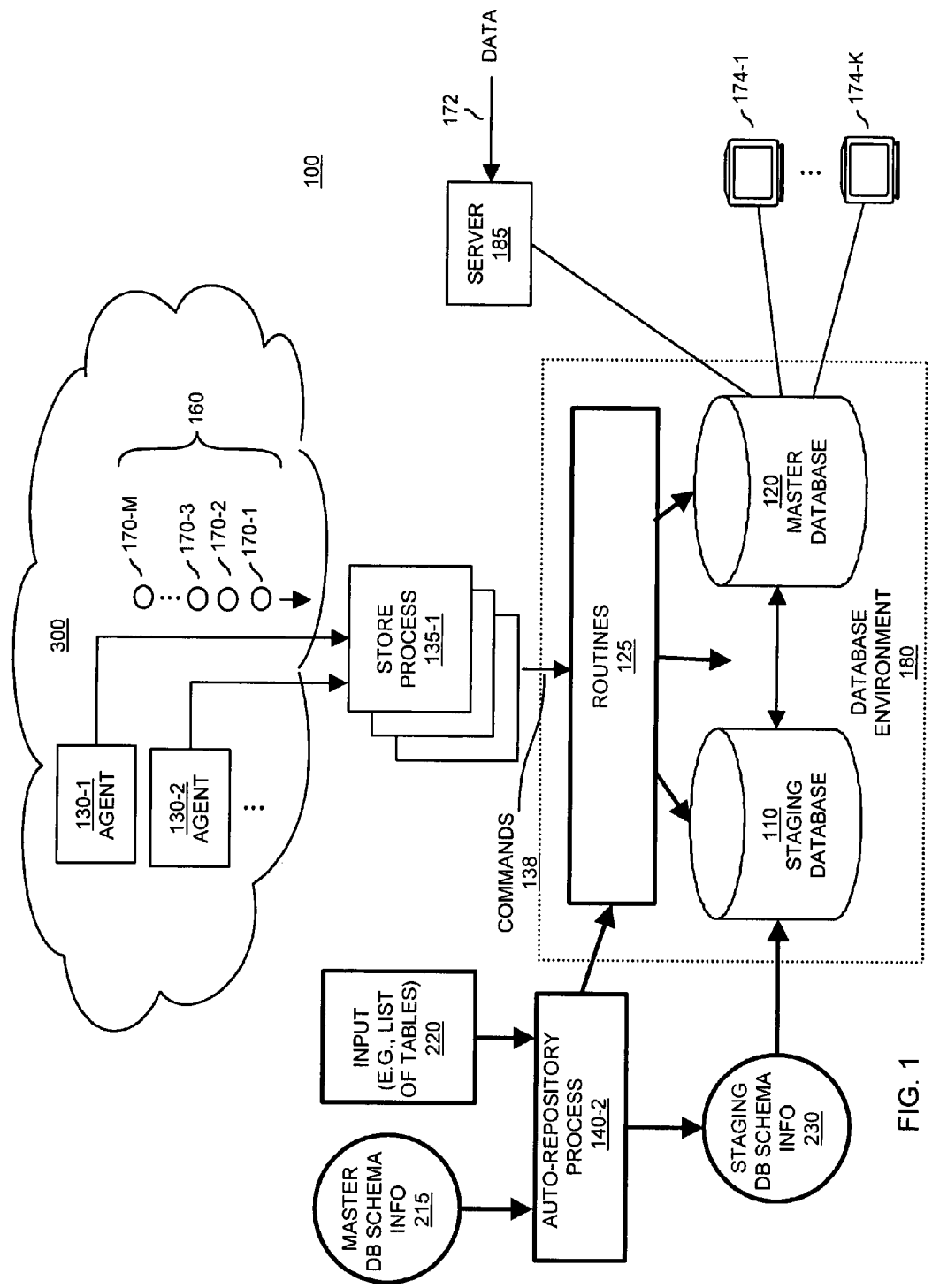
FIG. 1 is an example diagram illustrating a database environment for managing storage of data and generation of corresponding routines according to embodiments herein.

FIG. 1 is a diagram illustrating a storage area network environment in which auto-repository process 140-2 performs operations such as generation of routines 125 for management of database environment 180 according to embodiments herein. In one embodiment, the staging database 110 and the master database 120 are different logical databases instantiated in a single database via use of separate database schemas as will be discussed.

Figure 7:
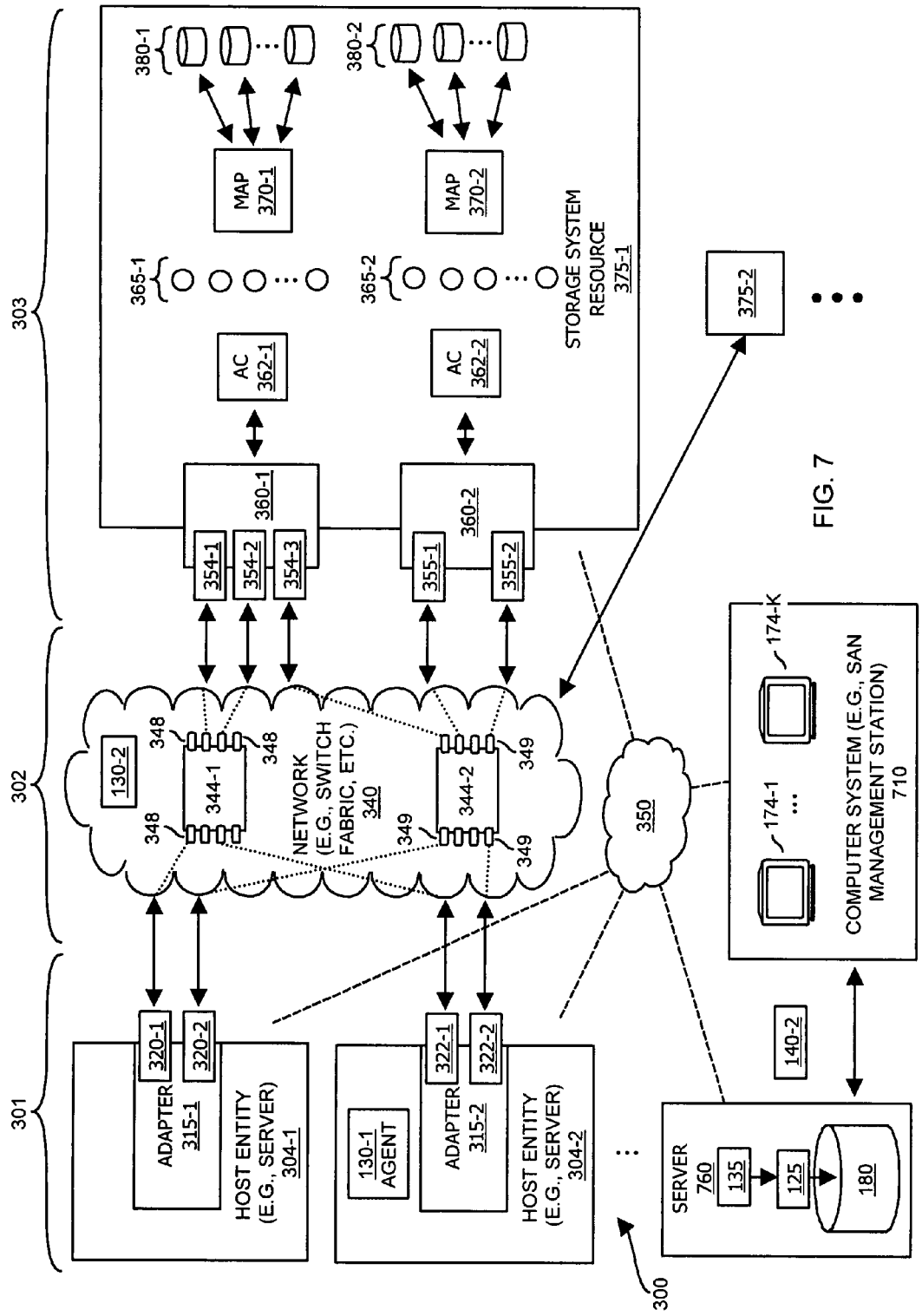
FIG. 7 is an example block diagram illustrating resources in a storage area network environment and a database for storing information about the resources according to embodiments herein.

As shown, storage area network 300 includes agents 130 (e.g., agent 130-1, agent 130-2, . . . ) for collecting partitions of data 170 (e.g., data 170-1, data 170-2, data 170-3, . . . , data 170-M) associated with storage area network resources present in storage area network 300 (see FIG. 7 for details associated with such resources). Each of agents 130 collects information from storage area network resources and forwards the information as data 170 to store processes 135 (e.g., store process 135-1, store process 135-2, . . . store process 135-K). The data 170 can include a large set of data called a dataset 160. The store processes 135 are configured to perform operations such as storage of the set of data in database environment 180.

Database environment 180 includes staging database 110 and master database 120 for storing information such as storage area network resource information collected by agents 130. In addition to store processes 135, the database environment 180 can receive input 172 (e.g., data) from server 185 for storage of corresponding in database environment 180 such as master database 120. Thus, both store processes 135 and other sources are able to provide input to database environment 180.

During a synchronization or refresh phase associated with database environment 180, relevant portions of data in the master database 120 can be copied to the staging database 110. Accordingly, storage area network environment 100 enables a flow of data from master database 120 to staging database 110 as well as from staging database 110 to master database 120. Other functions enable copying data in the staging database 110 to the master database 120.

In one embodiment, database environment includes routines 125 for carrying out different operations with respect to database environment 180. For example, via commands 138, store processes 135 can initiate execution of different callable routines 125 (e.g., procedures, functions, methods, subprograms, etc.) to perform operations such as: i) initiate storage of the retrieved data 170 in staging database 110, ii) initiate copying of information stored in the staging database 110 to the master database 120, iii) initiate a roll-back operation to recover from a database failure, iv) initiate direct storage of data from one or more store processes 135 to the master database 120, etc. In one embodiment, each of the routines 125 can include one or more SQL (Structured Query Language) instructions to carry out these different tasks in database environment 180.

Store processes 135 can initiate commands 138 to maintain synchronicity between the staging database 110 and the master database 120. During periods of no transaction processing as explained herein, the staging database 110 is normally in communication and is maintained in synchronicity with the master database 120.

Upon receiving a dataset 160 for storing in the staging database 110, the corresponding store processes 135 disengages a connection between the staging database 110 and the production database 120, such that the staging database 110 can receive the dataset 160 in its entirety prior to re-synchronizing the production database 120 with the staging database 110. This disengagement technique can include acquiring lock associated to the dataset 160 received from agent to prevent data modification from any other transaction (e.g. transaction initiated by one or more of consoles 174, agent 130 or server 185) into the master database 120 while the dataset 160 is being stored in the staging database 110 via a respective one or more of the store processes 135. Otherwise, during a process of synchronizing the staging database 110 with the master database 120, the new data inserted into the master database 120 could be accidentally overwritten by the dataset 160 inserted into the staging database 110.

Upon successful receipt of a dataset 160 (including multiple segments of data collected at different times), the store processes 135 store the dataset 160 in the staging database 110. In other embodiments, note that the store processes 135 can initiate storage of segments of data 170 via multiple store transactions such that each segment of data is subsequently stored in the database environment 180 over time rather than stored at substantially the same time.

After updating the staging database 110 with the data 170, the store processes 135 releases the lock acquired on dataset 160. This will allow any other transaction to modify the same data in staging database 110 or production database 120 after acquiring the lock. The master database 120 is then synchronized with the staging database 110 such that the master database 120 is updated with the dataset 160 previously inserted into the staging database 110. This update (of the master database 120) can include inserting, deleting, and/or updating data in the master database 120.

In one embodiment, auto-repository process 140-2 configures one or more of the routines 125 to enable storage of successively collected portions of data obtained from one or more software agents 130 into given tables of the staging database 110. In other words, the store processes 135 can call one or more of routines 125 to serially store data retrieved from agents 130 over a fairly long time period such as a half hour. Additionally, the auto-repository process 140-2 can generate another of routines 125 to enable a substantially instantaneous transfer of the data stored in the given tables of the staging database 110 to the master database 120. For example, after retrieval and storage of a complete set of related data in staging database 110, the store processes 135 can initiate another of routines 125 to copy the data in staging database 110 to master database 120 for synchronization purposes.

Database environment 180 stores data accessible by each of multiple users at consoles 174 (e.g., console 174-1, ..., console 174-K). For example, upon completion of the synchronization routine, the data in the dataset 160 will be available for display on the consoles 174. Via consoles 174, one or more storage area network administrators will be able to view stored information and perform actions on the managed objects stored in the databases. Thus, consoles 174 provide a way for users to manage (e.g., view, modify, etc.) information stored in database environment 180.

As mentioned above, when instantiated, database environment 180 includes staging database 110 and master database 120. Prior to instantiation, an administrator (e.g., one or more database developers) provides attributes associated with at least the master database 120 for storing information. For example, the database developers produce master database schema information 215 via one or more database modeling tools. As its name suggests, the master database schema information 215 defines a database model or storage structure associated with master database 120 used for storing data.

In addition to producing or providing the master database schema information 215, the administrator associated with database environment 180 also provides input 220 specifying portions (e.g., tables) of the master database schema to be replicated for use in the staging database 110. As will be discussed later in FIG. 2, auto-repository process 140-2 derives staging database schema information 230 as well as routines 125. As its name suggests, staging database schema information 230 defines a corresponding schema associated with staging database 110 for temporary or persistent storage of storage area network resource information.

Figure 2:
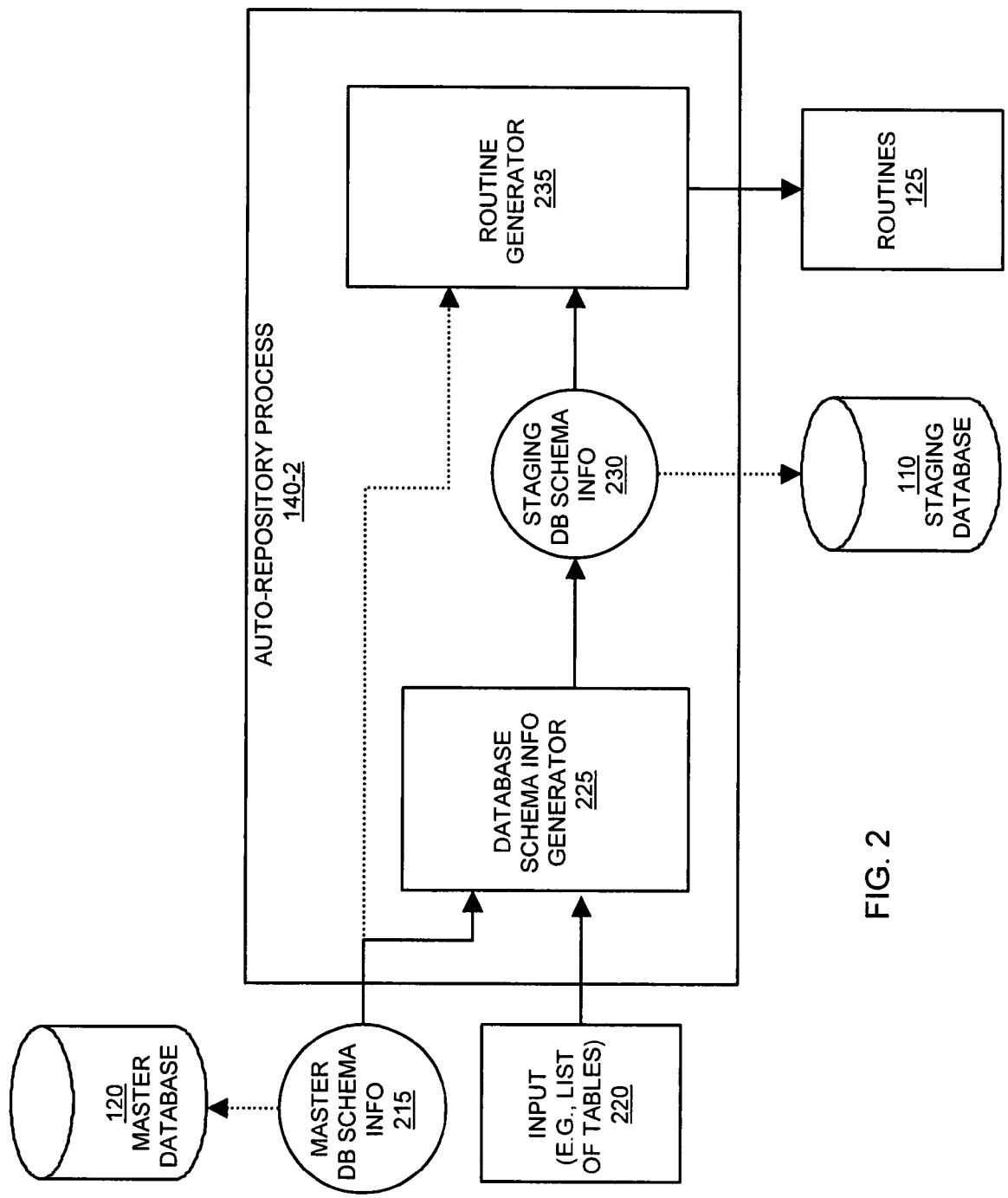
FIG. 2 is an example diagram illustrating an auto-repository process for generating staging database schema information and routines for managing a database environment according to embodiments herein.

FIG. 2 is an example diagram more particularly illustrating an auto-repository process 140-2 for producing routines 125 according to embodiments herein. As shown, an administrator provides master database schema information 215 (e.g., as created by a data model tool) and/or input 220 specifying portions of the master database schema to use in the staging database 110 for staging purposes.

Auto-repository process 140-2 includes database schema information generator 225 (e.g., a Java Script program) to produce the staging database schema associated with the staging database 110. For example, during a first phase, database schema generator 225 derives staging database schema information 230 (e.g., comma separated value files that contain information about the tables, indexes, constraints associated with staging database 110) based on master database schema information 215 and/or input 220. Indexes can be used to index specific columns of information in a respective table for speedy retrieval and copying of data information on a per-column basis.

Input 220 can be generated via a script or other type of program. As previously discussed, staging database schema information 230 defines a structure for storing information in staging database 110. In one embodiment, the database schema information generator 225 derives staging database schema information (e.g., scripts) including tables, relationship information, etc. for reproducing a subset or portion of the storage structure (e.g., hierarchy of tables) of the master database 120 into the staging database schema. Note that one or more replicated tables, relationships, etc. in staging database 110 may not be exact copies of tables, relationships, etc. in the master database 120. For example, one table may have one or more extra columns for storing information and additional auxiliary database tables [such as tables to store changeset, log, staging Transaction etc. to support partitioned data processing 160].

Changes to either or both of the master database schema information 215 and/or input 220 can require that database schema information generator be used again to derive an updated version of the staging database information generator 225.

Auto-repository 140-2 also includes a routine generator 235 (e.g., software such as a Java program) to produce routines 125 for managing database environment 180 as previously discussed. Depending on a respective configuration routine generator 235 can derive routines 125 based on staging database schema information 230 alone or a combination of staging database schema information 230 and master database schema information 215. In one embodiment, the routine generator 235 creates routines 125 based on at least in part on master database schema information 215 and staging database schema information 230 (e.g., metadata files).

As previously discussed, routines 125 as described herein can include procedures, functions, sub-routines, methods, etc. for carrying out different processing tasks. Each routine can include one or more instructions (e.g., SQL statements or instructions used for querying data in a relational database) defining specific activities, tasks, steps, operations, instructions, decisions, calculations, and/or processes, that when undertaken in a specified sequence, produces an intended result such as storage of information in the staging database 110, copying of data from the staging database 110 to the master database 120, etc.

Prior to actual population of data in each new version of a database environment 180, an administrator associated with storage area network environment 100 initiates generation of routines 125 via use of routine generator 235 (e.g., a software program configured to automatically perform tasks such as creation of routines 125 and staging database schema information 230). As mentioned above, the generated routines 125 are then used to carry out different pre-defined operations with respect to staging database 110 and the master database 120.

One type of change to the master database schema that will have an impact on routines 125 is addition or deletion of a column in a table (e.g., a row-column based resource in the database for storing a certain type of object data or storage area network resource information) associated with the master database schema information 215. In other words, if a new version of a database schema includes an extra table, then the routines must be modified to take into account the existence of the newly added table in order to manage the new database environment 180. During generation of an updated set of routines 125 that apply to the affected table (e.g., a table having an additional or deleted column), the routine generator 235 takes into account the new or deleted column when generating a new version of any routines that happens to perform operations with respect to the affected table.

As an example, one or more of routines 125 can enable copying of data from the staging database 110 to the master database 120. In a case where the master database 120 and the staging database 110 have schemas that have been modified to include an extra table for storing information, a newly updated routine that supports copying of information from the staging database 110 to the master database 120 takes into account (e.g., via appropriate SQL instructions) the newly added column in a respective table so that contents of the newly added table are copied over from the staging database 110 to the master database during synchronization. In other words, any routines that involve use of the new column must be configured to take into account the new column and its respective management.

Another type of change to the master database schema that has an impact on routines 125 is addition or deletion of a table to staging database 110 and/or master database 120. For routines 125 that are affected by a new or deleted table, the routine generator 235 takes into account (e.g., via SQL instructions) the new or deleted table when generating a new version of the routine to carry out a respective task for managing the database environment 180. In other words, any routines that involve use of the new table must be configured to take into account the new table and its respective management.

An example of generator code (associated with routine generator 235) for producing a staging compare routine to manage database environment 180 is as follows:

```
    static void stg_compare(File outputdir, String user, String staging_user, ArrayList listTables) throws IOException {
        System.out.println("stg_compare");
        sortTablesByName(listTables);
        PrintWriter pw=new PrintWriter(new FileWriter(new File (outputdir,"stg_compare. sql")));
        pw.println("CREATE OR REPLACE PROCEDURE COMPARESTAGING IS");
        pw.println("BEGIN");
        pw.println("--requires this table:");
        pw.println("--CREATE TABLE STG_COMPARE (");
        pw.println("--TABLENAME VARCHAR2(32) NOT NULL,");
        pw.println("--PERSISTENTID INTEGER NOT NULL);");
        pw.println( );
        pw.println("DELETE FROM STG_COMPARE;");
        pw.println( );
        Iterator it=listTables.iterator( )
        while (it.hasNext( )) {
            Table table=(Table)it.next( )
            String idcol=table.getPK( ).name;
            Iterator it2=table.cols.keySet( ).iterator( );
            String cols=" ";
            int n=0;
            while (it2.hasNext( ) {
                Column col=(Column)table.cols.get(it2.next( );
                if (col.name.equalsIgnoreCase("WHOMODIFIED") ||
                    col.name.equalsIgnoreCase("LASTUPDATETIMELCL")) continue;
                if (cols.length( )>0)
                    cols+=",";
                n++;
                cols+=col.name;
            }
            pw.println("INSERT INTO STG_COMPARE(TABLENAME,PERSISTENTID) (");
            pw.println("SELECT  '"+table.name+"',"+idcol+" FROM (");
            pw.println("SELECT "+cols+" FROM "+staging_user+"."+table.name);
            pw.println("MINUS");
            pw.println("SELECT "+cols+" FROM "+user+"."+table.name+")");
            pw.println("UNION");
            pw.println("SELECT  '"+table.name+"',"+idcol+" FROM (");
            pw.println("SELECT "+cols+" FROM "+user+"."+table.name);
            pw.println("MINUS");
            pw.println("SELECT "+cols+" FROM "+staging_user+"."+table.name+")");
            pw.println(");");
            pw.println( )
        }
        pw.println("END;");
        pw.println("/");
        pw.println( )
        pw.println("exit;");
        pw.println( )
        pw.close( )
    }
}
```

Figure 3:
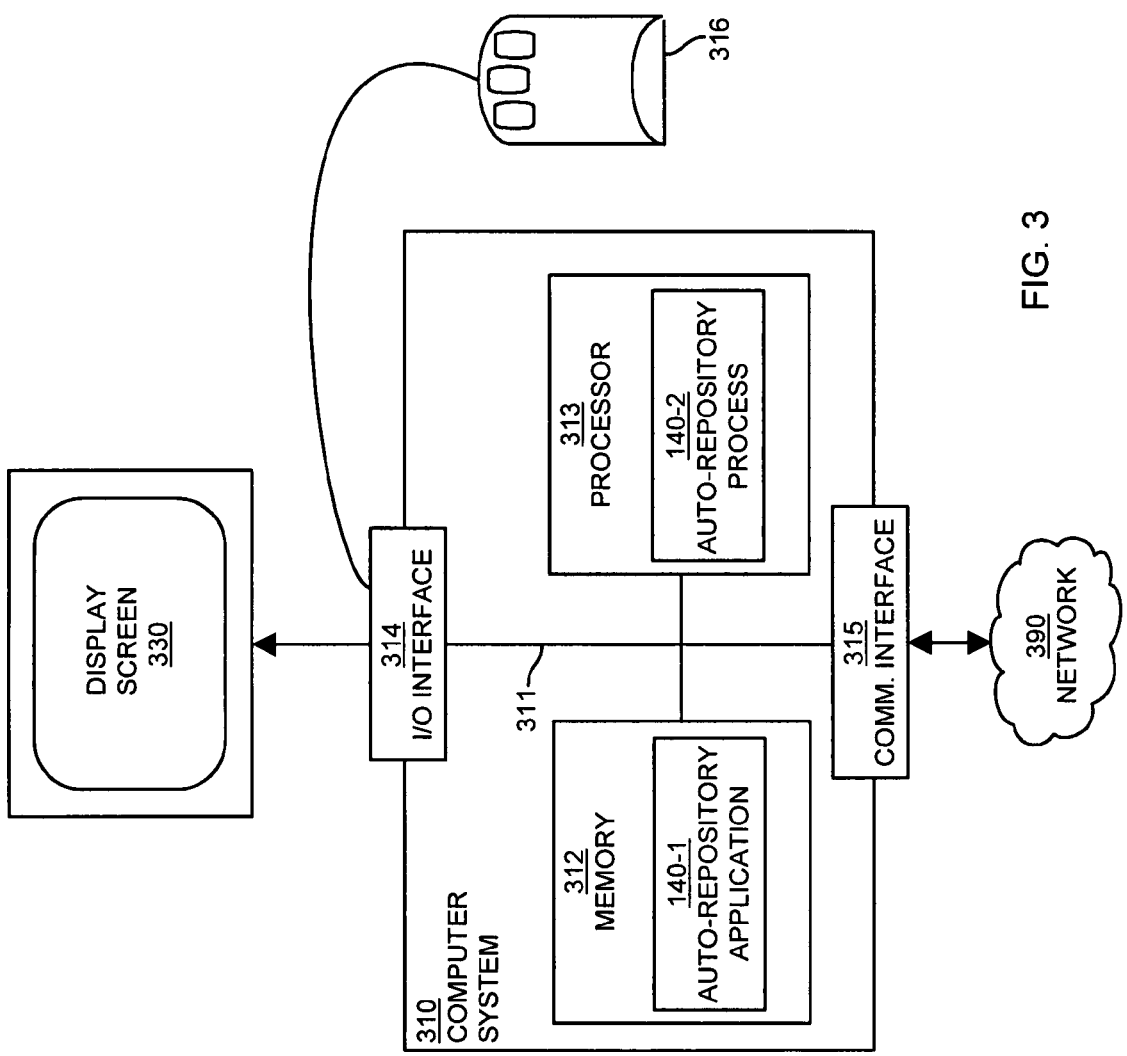
FIG. 3 is an example block diagram of a processing device suitable for generating a set of custom routines for managing a database environment according to embodiments herein.

FIG. 3 is a block diagram illustrating an example computer system 310 for executing auto-repository functions and other processes according to embodiments herein. Computer system 310 may be a computerized device such as a personal computer, workstation, portable computing device, console, network terminal, processing device, etc.

As shown, computer system 310 of the present example includes an interconnect 311 that couples a memory system 312, a processor 313, an I/O interface 314, and a communications interface 315. I/O interface 314 enables Computer system 310 can access master database schema information 215 through I/O interface 314 or communications interface 315. Communications interface 315 of computer system 310 enables computer system 310 to communicate over network 390 to transmit and receive information from different resources.

As shown, memory system 312 is encoded with auto-repository application 140-1 supporting generation of routines 125 and staging database schema information 230. Auto-repository application 140-1 can be embodied as software code such as data and/or logic instructions (e.g., code stored in the memory or on another computer readable medium such as a disk) that support functionality according to different embodiments described herein.

During operation of auto-repository application 140-1, processor 313 accesses memory system 312 via the interconnect 311 in order to launch, run, execute, interpret or otherwise perform the logic instructions of the auto-repository application 140-1. Execution of the auto-repository application 140-1 produces processing functionality in auto-repository process 140-2. In other words, the auto-repository process 140-2 represents one or more portions of the auto-repository application 140-1 (or the entire application) performing within or upon the processor 313 in the computer system 310.

It should be noted that auto-repository process 140-2 (also in FIG. 1) executed in computer system 310 can be represented by either one or both of the auto-repository application 140-1 and/or the auto-repository process 140-2. For purposes of this discussion and different embodiments herein, general reference will again be made to the auto-repository process 140-2 as performing or supporting the various steps and functional operations as previously discussed and as will be discussed further in this specification.

As mentioned, in addition to the auto-repository proces 140-2, embodiments herein include the auto-repository application 140-1 itself (i.e., the un-executed or non-performing logic instructions and/or data). The auto-repository application 140-1 may be stored on a computer readable medium such as a floppy disk, hard disk, or optical medium. The auto-repository application 140-1 may also be stored in a memory type system such as in firmware, read only memory (ROM), or, as in this example, as executable code within the memory system 312 (e.g., within Random Access Memory or RAM). In addition to these embodiments, it should also be noted that other embodiments herein include the execution of auto-repository application 140-1 in processor 313 as the auto-repository process 140-2. Thus, those skilled in the art will understand that the computer system 310 may include other processes and/or software and hardware components, such as an operating system that controls allocation and use of hardware resources.

Functionality supported by display auto-repository process 140-2 and other resources will now be discussed via flowcharts in FIG. 4-6.

Figure 4:
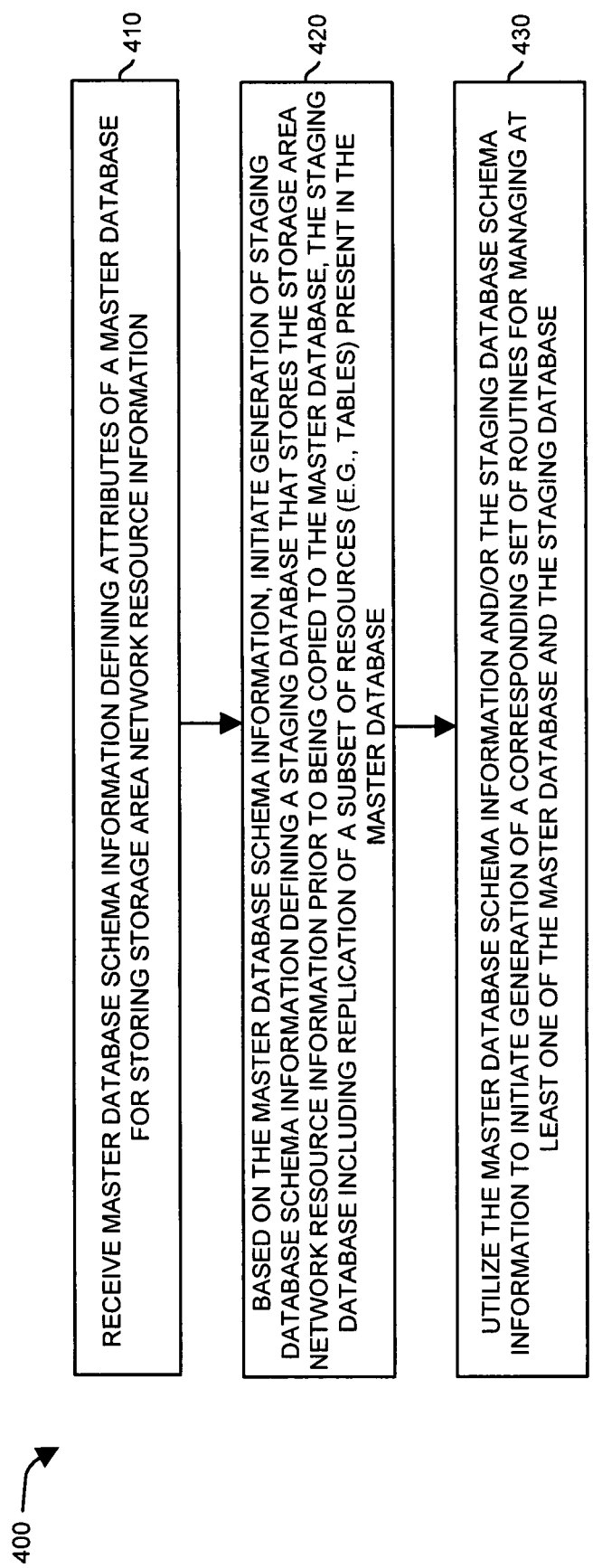
FIG. 4 is an example flowchart illustrating a technique of generating custom routines according to embodiments herein.

Now, more particularly, FIG. 4 is a flowchart 400 illustrating a technique of automatically generating routines 125 and/or staging database schema information 230 according to embodiments herein. Note that techniques discussed in flowchart 400 overlap with the techniques discussed above.

In step 410, the auto-repository process 140-2 receives master database schema information 215 defining attributes of a master database 120 for storing storage area network resource information. As previously discussed, store processes 135 can retrieve such information as collected by one or more agents 130.

In step 420, based on the master database schema information 215, the auto-repository process 140-2 initiates generation of staging database schema information 230 defining a staging database 110 that stores the storage area network resource information prior to being copied to the master database 120. As specified by the staging database schema information 230, the staging database 110 can include a replication of a subset of resources (e.g., tables, relationships, etc.) present in the master database.

In step 430, the auto-repository process 140-2 utilizes the master database schema information 215 and/or the staging database schema information 230 to initiate generation of a corresponding set of routines 125 for managing at least one of the master database 120 and the staging database 110.

As mentioned above, the process of generating the routines 125 and/or the staging database schema information 230 can be repeated each time there is a change with respect to the database environment 180. For example, the routines 125 must be generated again if an administrator makes changes with respect to either one or both of the staging database 110 and the master database 120.

Figure 5:
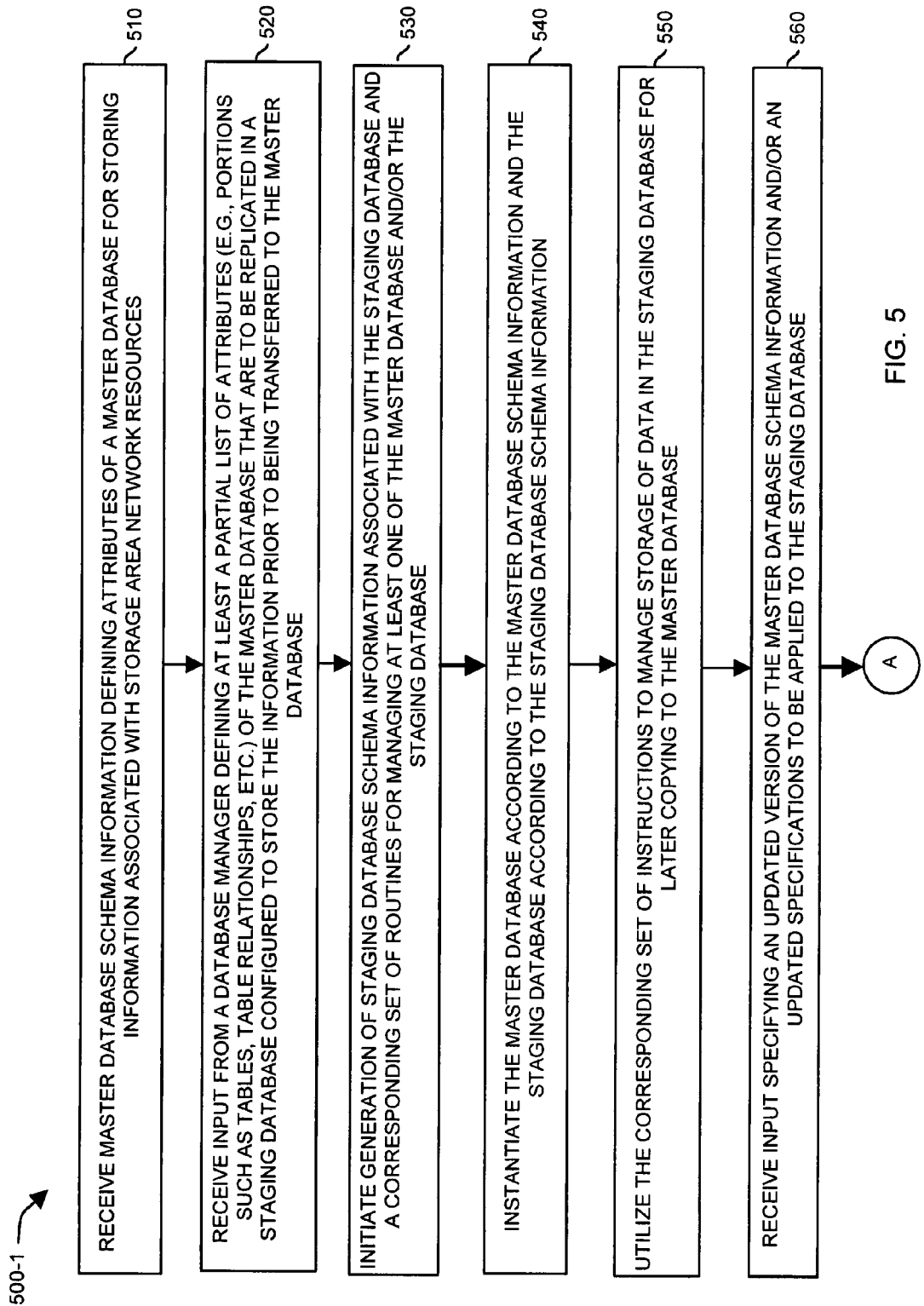
FIGS. 5 and 6 combine to form an example flowchart illustrating a technique facilitating management of object data according to embodiments herein.
Figure 6:
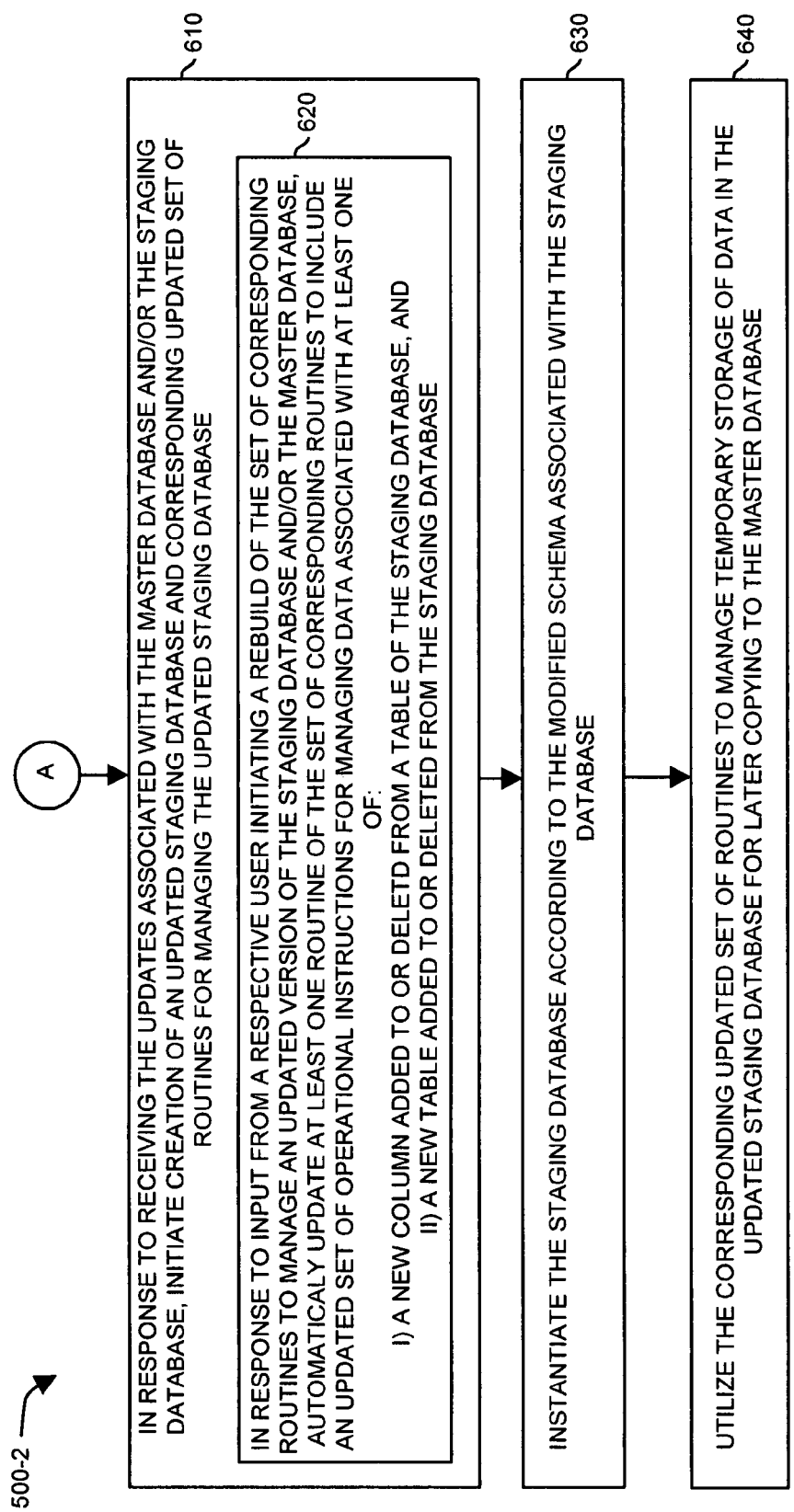

FIGS. 5 and 6 combine to form a detailed flowchart 500 (e.g., flowchart 500-1 and flowchart 500-2) illustrating techniques for maintaining information associated with a respective storage area network environment according to an embodiment herein. Note that techniques discussed in flowchart 500 overlap with the techniques discussed above in the previous figures.

In step 510 of flowchart 500-1, the auto-repository process 140-2 receives master database schema information 215 defining attributes of a master database 120 for storing information associated with storage area network resources.

In step 520, the auto-repository process 140-2 receives input 220 from a database manager defining at least a partial list of attributes (e.g., portions such as tables, table relationships, etc.) of the master database 120 that are to be replicated and used in a staging database 110 configured to store data associated with a storage area network environment 100.

In step 530, the auto-repository process 140-2 initiates generation of (e.g., derives) staging database schema information 230 associated with the staging database 110 and a corresponding set of routines 125 for managing at least one of the master database 120 and/or the staging database 110. In certain cases as previously discussed, the generated routines can include operations with respect to both the staging database 110 and the master database 120.

In step 540, an administrator associated with storage area network environment 100 instantiates the master database 120 according to the master database schema information 215 and the staging database 110 according to the staging database schema information 230.

In step 550, the store processes 135 utilize the corresponding set of instructions to manage temporary storage of data in the staging database 110 for later copying to the master database 120.

In step 560, assume that there is a change to be applied to the database environment 180. For example, assume that the auto-repository process 140-2 receives input specifying an updated version of the master database schema information 215 and/or an updated input 220. In other words, an administrator makes a modification to either or both schemas associated with the staging database 110 and the master database 120.

In step 610 of flowchart 500-2 in FIG. 6, in response to receiving the updates associated with the master database and/or the staging database or corresponding schemas, the auto-repository 140-2 initiates creation of an updated or new schema for the staging database 110 as well as an updated or new version of corresponding routines 125 for managing storage of information in the database environment 180. This is described in the following steps.

In sub-step 620 associated with step 610, based on input from a respective user initiating a rebuild of the set of corresponding routines 125 to manage an updated version of the staging database 110 and/or the master database 120, the auto-repository process 140-2 updates at least one routine of the set of corresponding routines to include an updated set of operational instructions for managing data associated with at least one of:

i) a new column added to a table of the staging database 110, and ii) a new table added to the staging database 110.

In step 630, the administrator associated with storage area network environment 100 instantiates the staging database 110 according to the newly generated staging database schema information.

In step 640, the store processes 135 utilize the corresponding updated set of routines 125 to manage tasks with respect to database environment 180. As previously discussed, this can include initial storage of data in the updated staging database 110 for later copying to the master database 120.

FIG. 7 is an example block diagram of different resources and corresponding connectivity of example network resources (e.g., host resources 301, switch resources 302, and storage resources 303) in storage area network 300 according to embodiments herein. As previously discussed, agents 130 reside at different locations in the storage area network 300 and collect data for transmission to store processes 135. Store processes 135 store retrieved data in database environment 180 as discussed above with respect to the previous figures. One or more administrators at computer systems 710 can access the information stored in database environment 180 for viewing on consoles 174.

As shown, storage area network 300 includes host entity 304-1, host entity 304-2, . . . (collectively, host entities 304), network 340 (e.g., a high speed fiber-based switch fabric), network 350 (e.g., LAN, WAN, Internet, intranet, etc.), storage system resource 375-1, storage system resource 375-2, computer system 110, and database 180. Network 340 includes switch device 344-1, switch device 344-2, and corresponding switch ports 348 and 349. Host entity 304-1 includes adapter 315-1. Adapter 315-1 (e.g., host bus adapter) has a corresponding port 320-1 and port 320-2 to communicate (e.g., via a fiber link) over network 340. Host entity 304-2 includes adapter 315-2. Adapter 315-2 has corresponding port 322-1 and port 322-2 to communicate over network 340. Storage system resource 375-1 includes respective adapters 360-1 and 360-2, corresponding ports 354-1, 354-2, 354-3, 355-1 and 355-2, access controllers 362-1 and 362-2, storage devices 365-1 and 365-2, maps 370-1 and 370-2, as well as physical storage devices 380-1 and 380-2.

A user at one of consoles 174 can retrieve the managed objects from database 180 for viewing on a respective display screen. The display of managed objects (stored in database environment 180) provides an indication of a respective configuration of the storage area network 300.

In general, network 340 and related resources enable host entities 304 (e.g., clients, host computers, etc.) to access data in storage system resources 375. As an example, host entity 304-1 couples to network 340 via adapter 315-1 and corresponding ports 320. Ports 320 couple to respective ports 348 and 349 on switch devices 344 via a link such as a fiber cable. In turn, ports 348 and 349 of switch devices 344 couple to ports 354 and 355 (e.g., via a fiber cable) of corresponding storage system resources 375. Thus, switch devices 344 and corresponding ports 348 and 349 form at least part of a connection path between host entities 304 and corresponding storage system resources 375.

Storage system resource 375-1 (e.g., a storage system) includes access controllers 362 to facilitate access to corresponding storage devices 365 (e.g., logical storage space or devices). Storage devices 365 are configured as logical portions of one or more physical storage devices 380 (e.g., arrays of one or more storage disks or portions thereof). Maps 370 provide a mapping of storage devices 365 (e.g., logical volumes) to corresponding physical storage devices 380 (e.g., storage disks).

Each host entity 304 may be limited to accessing certain storage devices 365 in storage system resource 375-1 based at least in part on configuration settings of switch devices 344 of network 340. Consoles 174 enable users to modify a configuration of the storage area network. For example, computer system 710 enables a user such as a network administrator to manage database 180 and/or modify a respective storage area network configuration.

As discussed above, techniques herein are well suited for use in a database environment 180 including a staging database 110 and a master database 120 for managing storage of storage area network resource information in a database. However, it should be noted that embodiments herein are not limited to use in such applications.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present application. As such, the foregoing description of embodiments of the present application is not intended to be limiting. Rather, any limitations to the invention are presented in the following claims.

What is claimed is:

1. A method comprising:

receiving master database schema information defining attributes of a master database for storing storage area network resource information;

based on the master database schema information, initiating generation of staging database schema information associated with a staging database for storage of the storage area network resource information prior to being copied to the master database, the staging database including a subset of resources in the master database; and in accordance with the staging database schema information and the master database schema information, via a processor device in a computer system, initiating generation of a corresponding set of routines for managing the staging database;

accessing a repository to obtain a definition of the master database;

receiving input from a database manager specifying tables in the master database for replication and inclusion in the staging database, the staging database configured to at least temporarily store the storage area network resource information prior to the storage area network resource information being copied to the master database;

based on master database schema information and the input from the database manager; generating staging database schema information that defines a relational storage structure associated with the staging database for temporarily storing the storage area network resource information;

wherein generation of the corresponding set of routines comprises:

generating the corresponding set of routines to include a set of callable database routines for use by a database manager application to manage storage of storage area network resource information in the staging database and the master database, the database manager application at least temporarily storing the storage area network resource information in the staging database schema for subsequent copying of the storage area network resource information from the staging database to the master database; and deriving the corresponding set of routines for managing the staging database based on the staging database schema.

2. A method as in claim 1, wherein initiating generation of the staging database schema comprises generating metadata files that define the relational storage structure associated with the staging database, the relational structure defining a relationship of storage locations for storing data in the staging database;

wherein initiating generation of the corresponding set of routines comprises: deriving the corresponding set of routines for managing the staging database based on contents of the metadata files, the method further comprising:

configuring at least one routine of the corresponding set of routines to include index information from the metadata files, the index information specifying how to copy data from the staging database to the master database on a per-column basis; and initiating execution of the at least one routine to copy data stored in the staging database to the master database.

3. A method as in claim 1 further comprising:

receiving input defining at least a partial list of attributes of the staging database that temporarily stores the information prior to being transferred to the master database; and initiating generation of staging database schema information at least partially based on the input.

4. A method as in claim 3, wherein receiving the input includes receiving a listing specifying portions of the main database schema to be replicated for inclusion in the staging database schema.

5. A method as in claim 1 further comprising:
receiving input specifying an updated portion of the master database for use in creating the staging database; and
in response to receiving the input specifying the updated portion, initiating creation of an updated staging database and corresponding updated set of routines for managing the updated staging database.

6. A method as in claim 1, wherein initiating generation of the staging database schema information includes generating scripts configured to produce a hierarchy of tables and corresponding relationships of data stored in the hierarchy of tables to temporarily store the storage area network resource information prior to being copied to the master database.

7. A method as in claim 1, wherein initiating creation of the corresponding set of routines comprises:
in response to input from a respective user initiating a rebuild of the set of corresponding routines to manage an updated version of the staging database and the master database, updating at least one routine of the set of corresponding routines to include an updated set of operational instructions for managing data associated with at least one of:
i) a new column added to a table of the staging database, and
ii) a new table added to the staging database.

8. A method as in claim 1, wherein initiating generation of the corresponding set of routines includes:
generating a first routine of the corresponding set of routines to enable storage of collected portions of data received from a software agent into given tables of the staging database;
initiating execution of the first routine to store the collected portions of data in the given tables of the staging database;
generating a second routine of the corresponding set of routines to enable a substantially instantaneous copy of the data stored in the given tables of the staging database to the master database; and
initiating execution of the second routine to copy the data stored in the given tables of the staging database to respective tables in the master database.

9. The method as in claim 1, wherein initiating generation of the staging database schema information includes: deriving the staging database schema information from a portion of the master database schema information, the method further comprising:
instantiating the staging database based on the staging database schema information, the staging database including replicated portions of the master database for storing data;
acquiring a temporary lock to prevent storage of data in the master database;
during the temporary lock and based on execution of a first routine in the corresponding set, storing the data in the staging database; and
based on execution of a second routine in the corresponding set, copying the data from the staging database to the master database.

10. The method as in claim 9 further comprising:
based on execution of a third routine in the corresponding set, initiating simultaneous storage of data in both the staging database and the master database.

11. The method as in claim 1 further comprising:
configuring at least one routine of the set of corresponding routines to include index information from the metadata files for copying of data from the staging database to the master database on a per-column basis.

12. The method as in claim 1 further comprising:
receiving input specifying an updated version of the master database schema information;
in response to receiving the updated version of the master database schema information, initiating creation of an updated staging database and corresponding updated set of routines for managing the updated staging database;
in response to input from a respective user initiating a rebuild of the corresponding set of routines to manage the updated staging database, updating at least one routine of the corresponding set of routines to include an updated set of routines for managing data associated with: i) a new column added to a table of the staging database, and ii) a new table added to the staging database;
instantiating the staging database according to the modified schema associated with the staging database; and
utilizing the updated set of routines to manage temporary storage of data in the updated staging database for later copying of the data to the master database.

13. A computer system comprising:
a processor;
a memory unit that stores instructions associated with an application executed by the processor; and
an interconnect coupling the processor and the memory unit, enabling the computer system to execute the application and perform operations of:
receiving master database schema information defining attributes of a master database for storing storage area network resource information;
based on the master database schema information, initiating generation of staging database schema information associated with a staging database for storage of the storage area network resource information prior to being copied to the master database, the staging database including a subset of resources in the master database; and
in accordance with the staging database schema information and the master database schema information, initiating generation of a corresponding set of routines for managing at least one of the master database and the staging database;
accessing a repository to obtain a definition of the master database;
receiving input from a database manager specifying tables in the master database for replication and inclusion in the staging database, the staging database configured to at least temporarily store the storage area network resource information prior to the storage area network resource information being copied to the master database;
based on master database schema information and the input from the database manager, generating staging database schema information that defines a relational storage structure associated with the staging database for temporarily storing the storage area network resource information;
wherein generation of the corresponding set of routines comprises:
generating the corresponding set of routines to include a set of callable database routines for use by a database manager application to manage storage of storage area network resource information in the staging database and the master database, the database manager application at least temporarily storing the storage area network resource information in the staging database schema for subsequent copying of the storage area network information from the staging database to the master database; and deriving the corresponding set of routines for managing the staging database based on the staging database schema.

14. A computer system as in claim 13, wherein initiating generation of the corresponding includes:

initiating execution of a first routine of the corresponding set of routines to store collected portions of data received from a software agent into given tables of the staging database; and initiating execution of a second routine of the corresponding set of routines to copy data stored in the given tables of the staging database to the master database.

15. Software encoded on one or more computer-readable storage media and, when executed, operable to perform steps of:

receiving master database schema information defining attributes of a master database for storing storage area network resources information;

based on the master database schema information, initiating generation of staging database schema information associated with a staging database for storage of the storage area network resource information prior to being copied to the master database, the staging database including a subset of resources in the master database; and in accordance with the staging database schema information and the master database schema information, initiating generation of a corresponding set of routines for managing at least one of the master database and the staging database;

accessing a repository to obtain a definition of the master database;

receiving input from a database manager specifying tables in the master database for replication and inclusion in the staging database the staging database configured to at least temporarily store the storage area network resource information prior to the storage area network resource information being copied to the master database;

based on master database schema information and the input from the database manager, generating staging database schema information that defines a relational storage structure associated with the staging database for temporarily storing the storage area network resource information;

wherein generation of the corresponding set of routines comprises:

generating the corresponding set of routines to include a set of callable database routines for use by a database manager application to manage storage of storage area network resource information in the staging database and the master database, the database manager application at least temporarily storing the storage area network information in the staging database schema for subsequent copying of the storage area network information from the staging database to the master database; and deriving the corresponding set of routines for managing the staging database based on the staging database schema.

* * * * *